(12) United States Patent
Kim

(10) Patent No.: US 9,430,877 B2
(45) Date of Patent: Aug. 30, 2016

(54) ELECTRONIC DEVICE AND METHOD FOR SELECTING AUGMENTED CONTENT USING THE SAME

(71) Applicant: WILUS INSTITUTE OF STANDARDS AND TECHNOLOGY INC., Seoul OT (KR)

(72) Inventor: Seung Il Kim, Seoul (KR)

(73) Assignee: WILUS INSTITUTE OF STANDARDS AND TECHNOLOGY INC., Seoul (KR)

(*) Notice: Subject to any disclaimer, the term of this patent is extended or adjusted under 35 U.S.C. 154(b) by 183 days.

(21) Appl. No.: 14/164,270

(22) Filed: Jan. 27, 2014

(65) Prior Publication Data

US 2014/0210858 A1 Jul. 31, 2014

Related U.S. Application Data

(60) Provisional application No. 61/756,470, filed on Jan. 25, 2013.

(51) Int. Cl.
*G09G 5/00* (2006.01)
*G06T 19/00* (2011.01)
*G06F 3/147* (2006.01)

(52) U.S. Cl.
CPC ............ *G06T 19/006* (2013.01); *G06F 3/147* (2013.01)

(58) Field of Classification Search
None
See application file for complete search history.

(56) References Cited

U.S. PATENT DOCUMENTS

| | | | | |
|---|---|---|---|---|
| 8,854,356 B2* | 10/2014 | Oyagi | ................... | G06T 19/006 345/419 |
| 8,948,451 B2* | 2/2015 | Ikenoue | ................... | G06F 3/005 382/103 |
| 2007/0038944 A1* | 2/2007 | Carignano | ............... | G06T 15/20 715/757 |
| 2012/0032977 A1* | 2/2012 | Kim | ..................... | G06T 19/006 345/633 |
| 2014/0218361 A1* | 8/2014 | Abe | ........................ | G06T 19/006 345/424 |
| 2014/0267404 A1* | 9/2014 | Mitchell | ............... | G06T 19/006 345/633 |
| 2014/0306994 A1* | 10/2014 | Brown | ................... | G06T 19/006 345/633 |

* cited by examiner

*Primary Examiner* — M Good Johnson
(74) *Attorney, Agent, or Firm* — Park, Kim & Suh, LLC

(57) ABSTRACT

Disclosed are an electronic device and a method for selecting augmented content that selectively augment various types of content with respect to a real object using a marker. The electronic device providing augmented reality, comprising: a memory storing at least one content group, wherein each of the at least one content group includes a plurality of virtual objects; a display; and a controller configured to: capture, via the camera, an image including a real object and a marker, obtain identification information on the real object based on the image, obtain angle information reflecting an orientation of the marker with respect to the real object using the image, determine a specific content group from the at least one content group based on the identification information, select a specific virtual object among the virtual objects include in the specific content group based on the angle information, and augment, via the display, the specific virtual object.

23 Claims, 15 Drawing Sheets

FIG. 9

| # | Contents | Angle |
|---|---|---|
| 1 | MERCURY | 0~40° |
| 2 | VENUS | 40~80° |
| 3 | EARTH | 80~120° |
| 4 | MARS | 120~160° |
| 5 | JUPITER | 160~200° |
| 6 | SATURN | 200~240° |
| 7 | UNRANUS | 240~280° |
| 8 | NEPTUNE | 280~320° |
| 9 | PLUTO | 320~360° |

FIG. 10

| Real Object | Content Group ID | # | Contents | Angle |
|---|---|---|---|---|
| Circle Board | Planet | 1 | MERCURY | 0~40° |
| | | 2 | VENUS | 40~80° |
| | | 3 | EARTH | 80~120° |
| | | 4 | MARS | 120~160° |
| | | 5 | JUPITER | 160~200° |
| | | 6 | SATURN | 200~240° |
| | | 7 | UNRANUS | 240~280° |
| | | 8 | NEPTUNE | 280~320° |
| | | 9 | PLUTO | 320~360° |
| Haxagon Board | Continent | 1 | Asia | 0~60° |
| | | 2 | North America | 60~120° |
| | | 3 | South America | 120~180° |
| | | 4 | Europe | 180~240° |
| | | 5 | Africa | 240~300° |
| | | 6 | Oceania | 300~360° |

ELECTRONIC DEVICE AND METHOD FOR SELECTING AUGMENTED CONTENT USING THE SAME

CROSS REFERENCE TO RELATED APPLICATION

This application claims priority benefits under 35 U.S.C. §119(e) from U.S. Provisional Application No. 61/756,470, filed on Jan. 25, 2013 and entitled "Display device and method for selecting augmented content", which is hereby incorporated by reference as if fully set forth herein.

BACKGROUND OF THE INVENTION

1. Field of the Invention

The present invention relates to an electronic device and a method for selecting augmented content using the same and, more particularly, to an electronic device and a method for selecting augmented content that selectively augment various types of content with respect to a real object using a marker.

2. Description of the Related Art

Augmented reality (AR) refers to a mixed form of a real environment and a virtual environment constructed by a computer. AR is also referred to as mixed reality (MR) since a real environment and a virtual environment are combined in real time to be provided as an image.

AR provides reality superior to virtual reality (VR) since it is provided by mixing a real environment and a virtual environment and allows a user to interact with a real environment.

With the recent popularization of smartphone, AR is widely used in various fields including entertainment and development of various AR technologies using a wearable computer including HMD (head-mounted device), a car window, etc. is expected.

SUMMARY OF THE INVENTION

Therefore, the present invention has been made in view of the above problems, and it is an object of the present invention to provide an electronic device and a method for selecting augmented content using the same to allow a user to easily select augmented content.

The technical problems solved by the present invention are not limited to the above technical problems and those skilled in the art may understand other technical problems from the following description.

In accordance with an aspect of the present invention, the above and other objects can be accomplished by the provision of an electronic device providing augmented reality, comprising: a memory storing at least one content group, wherein each of the at least one content group includes a plurality of virtual objects; a display; and a controller configured to: capture, via the camera, an image including a real object and a marker, obtain identification information on the real object based on the image, obtain angle information reflecting an orientation of the marker with respect to the real object using the image, determine a specific content group from the at least one content group based on the identification information, select a specific virtual object among the virtual objects include in the specific content group based on the angle information, and augment, via the display, the specific virtual object.

In accordance with another aspect of the present invention, the above and other objects can be accomplished by the provision of an electronic device providing augmented reality, comprising: a communication module communicating with an external device; a camera; a display; and a controller configured: capture, via the camera, an image including a real object and a marker, obtain identification information on the real object based on the image, obtain angle information reflecting an orientation of the marker with respect to the real object using the image, send, via the communication module, the identification information and the angle information to a server, wherein the server comprises a database storing at least one content group and each of the at least one content group includes a plurality of virtual objects, receive, via the communication module, a specific virtual object from the server, wherein the server determines a specific content group from the at least one content group based on the identification information and selects a specific virtual object among the virtual objects based on the angle information, and augment, via the display, the specific virtual object.

In accordance with still another aspect of the present invention, the above and other objects can be accomplished by the provision of a method for selecting augmented content, performed by an electronic device providing augmented reality, the method comprising: capturing an image including a real object and a marker; obtaining identification information on the real object based the image; obtaining angle information reflecting an orientation of the marker with respect to the real object using the image; and augmenting a specific virtual object corresponding to the orientation of the marker with respect to the real object among a plurality of virtual objects corresponding to the real object.

BRIEF DESCRIPTION OF THE DRAWINGS

The above and other objects, features and other advantages of the present invention will be more clearly understood from the following detailed description taken in conjunction with the accompanying drawings, in which:

FIG. 9 illustrates an example of a data table of a memory in the method for selecting augmented content shown in FIG. 4;

FIG. 10 illustrates another example of the data table of the memory in the method for selecting augmented content shown in FIG. 4;

DETAILED DESCRIPTION OF THE INVENTION

Figure 1:
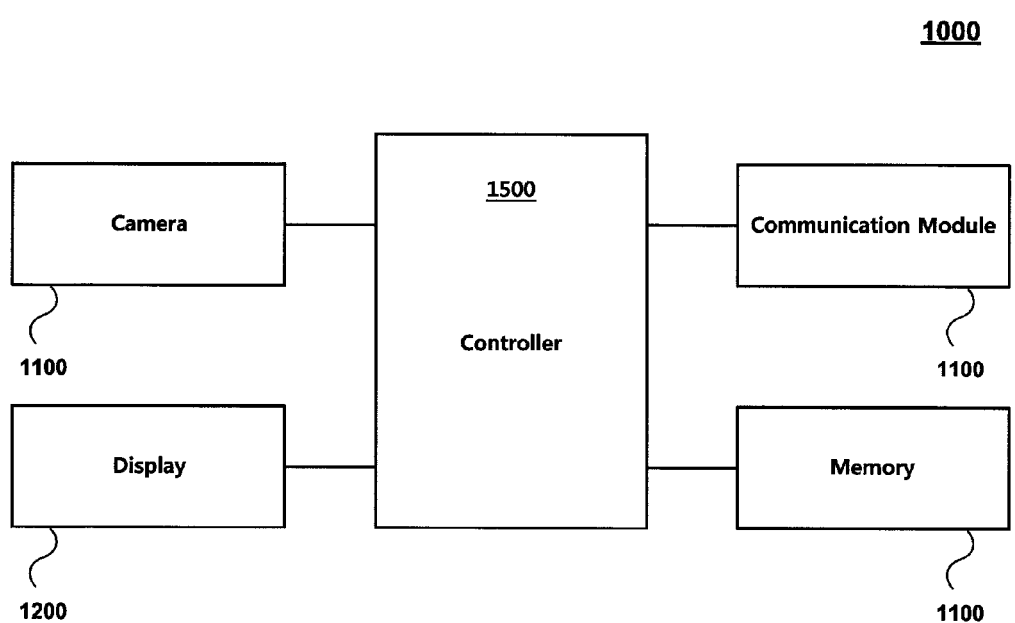
FIG. 1 is a block diagram of an electronic device according to an embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention.

Terms used in the specification and attached drawings are for the purpose of easily explaining the present invention. In the drawings, dimensions are exaggerated for clarity and convenience of description and thus the present invention is not limited by the terms and the attached drawings.

In the following description of the present invention, a detailed description of known functions and configurations incorporated herein will be omitted when it may obscure the subject matter of the present invention.

According to one aspect of the present invention, there is provided an electronic device providing augmented reality, comprising: a memory storing at least one content group, wherein each of the at least one content group includes a plurality of virtual objects; a display; and a controller configured to: capture, via the camera, an image including a real object and a marker, obtain identification information on the real object based on the image, obtain angle information reflecting an orientation of the marker with respect to the real object using the image, determine a specific content group from the at least one content group based on the identification information, select a specific virtual object among the virtual objects include in the specific content group based on the angle information, and augment, via the display, the specific virtual object.

The orientation of the marker with respect to the real object may be defined as a direction from the center of the real object to the marker.

The controller may obtain, using the image, first position information about the real object and second position information about the maker and calculate the angle information based on the first position information and the second position information.

The orientation of the marker with respect to the real object may be defined as a rotated angle of the real object with respect to a reference direction from the real object to the marker.

The controller may obtain, using the image, orientation information about the orientation of the real object and direction information about the reference direction and calculate the angle information based on the orientation information and the direction information.

The display may include a transparent display and the controller may display, via the transparent display, the specific virtual object at a region where the real object is projected.

The controller may generate an augmented image by inserting the specific virtual object into the captured image, and display, via the display, the augmented image.

The controller may augment the specific virtual object to the real object.

According to another aspect of the present invention, there is provided an electronic device providing augmented reality, comprising: a communication module communicating with an external device; a camera; a display; and a controller configured: capture, via the camera, an image including a real object and a marker, obtain identification information on the real object based on the image, obtain angle information reflecting an orientation of the marker with respect to the real object using the image, send, via the communication module, the identification information and the angle information to a server, wherein the server comprises a database storing at least one content group and each of the at least one content group includes a plurality of virtual objects, receive, via the communication module, a specific virtual object from the server, wherein the server determines a specific content group from the at least one content group based on the identification information and selects a specific virtual object among the virtual objects based on the angle information, and augment, via the display, the specific virtual object.

The controller may obtain, using the image, first position information about the real object and second position information about the marker and calculate the angle information based on the first position information and the second position information.

The orientation of the marker with respect to the real object may be defined as a rotated angle of the real object with respect to a reference direction from the real object to the marker.

The controller may obtain, using the image, orientation information about the orientation of the real object and direction information about the reference direction from the real object to the marker and calculate the angle information based on the orientation information and the direction information.

The display may include a transparent display and the controller may display, via the transparent display, the specific virtual object, at a region where the real object is projected.

The controller may generate an augmented image by inserting the specific virtual object into the captured image, and may display, via the display, the augmented image.

The controller may augment the specific virtual object to the real object.

According to still another aspect of the present invention, there is provided a method for selecting augmented content, performed by an electronic device providing augmented reality, the method comprising: capturing an image including a real object and a marker; obtaining identification information on the real object based the image; obtaining angle information reflecting an orientation of the marker with respect to the real object using the image; and augmenting a specific virtual object corresponding to the orientation of the marker with respect to the real object among a plurality of virtual objects corresponding to the real object.

The obtaining the angle information may comprise: obtaining first position information about the real object and second position information about the marker using the image; and calculating the angle information based on the first position information and the second position information.

The obtaining the angle information may comprise: obtaining orientation information about an orientation of the real object and direction information about a direction from the real object to the marker using the image; and calculating the angle information based on the orientation information and the direction information.

The augmenting may comprise: determining the plurality of the virtual objects from pre-stored virtual objects based on the identification information; selecting the specific virtual object among the plurality of the virtual object based on the angle information; and augmenting the selected specific virtual object to the real object.

The augmenting may comprise: sending the identification information and the angle information to a server, wherein the server comprises a database storing pre-stored virtual objects; receiving the specific virtual object from the server, wherein the server determines the plurality of the virtual objects from the pre-stored virtual objects based on the identification information; and augmenting the received specific virtual object to the real object.

The augmenting may comprise displaying the specific virtual object on a transparent display at a region where the real object is projected.

The augmenting may comprise: generating an augmented image by inserting the specific virtual object into the captured image; and displaying the augmented image.

The augmenting may comprise augmenting the specific virtual object to the real object.

A description will be given of an electronic device 1000 according to an embodiment of the present invention.

The electronic device 1000 according to an embodiment of the present invention can provide augmented reality.

FIG. 1 is a block diagram of the electronic device 1000 according to an embodiment of the present invention.

Referring to FIG. 1, the electronic device 1000 may include a camera 1100, a display 1200, a communication module 1300, a memory 1400 and a controller 1500. These components will now be described in detail.

The camera 1100 can capture images. The camera 1100 can acquire an image such as a still image or a moving image through an image sensor. The camera 1100 can include a 3-dimensional camera 1100 such as a depth camera as well as a general camera 1100.

The display 1200 can display images to provide augmented reality.

According to one embodiment, the display 1200 can display an image generated by augmenting an image captured by the camera 1100. That is, the display 1200 can provide augmented reality by displaying an augmented image generated by inserting content into the image captured by the camera 1100.

According to another embodiment, the display 1200 may be a transparent display capable of providing augmented reality by projecting an object or environment located behind the display 1200 and, at the same time, displaying content.

Examples of the display 1200 include an organic liquid crystal display (LCD), an organic light emitting diode (OLED) display, a flat panel display (FPD), a flexible display, a 3D display, a holographic display, a transparent display, etc.

The display 1200 can be implemented as a touchscreen. The display 1200 can include a touch sensitive module mounted therein, which senses touch input applied to a screen displaying images.

Upon touch of a specific point of the screen of the display 1200, the touch sensitive module can generate an electric signal according to pressure variation or capacitance variation. By using this electric signal, it is possible to detect whether or not touch is applied, a touched point, touched area, touch intensity, touch pressure, etc.

For example, the touch sensitive module can be implemented in the form of a touch film, a touch sheet, a touch pad, etc. attached to the screen of the display 1200 in an integrated manner. Here, the touch film, touch sheet and touch pad can be implemented as a capacitive touch sensor, a resistive touch sensor or an optical touch sensor.

The communication module 1300 can transmit/receive data to/from an external device. The communication module 1300 can be connected to a device or network in a wired or wireless manner to receive or transmit data. For example, the communication module 1300 can access a mobile communication network through third generation mobile communication or fourth generation mobile communication such as WiBro or LTE (long term evolution). Alternatively, the communication module 1300 can perform short range communication according to protocol such as Wi-Fi, Bluetooth, Zigbee, NFC (near field communication), RFID (radio frequency identification), etc. The memory 1400 can store data. The memory 1400 can semipermanently store data or temporarily store data as a buffer for data transmission.

The memory 1400 can be implemented as a storage medium such as ROM (read only memory), EEPROM (electrically erasable programmable read-only memory), RAM (random access memory), flash memory, hard disk, optical disc, etc. Examples of the flash memory include a multimedia card (MMC), SD (secure digital) memory, XD (extreme digital) memory, etc. Examples of the optical disk include a compact disc (CD), Blue-ray disc (BD), etc. In addition, the memory 1400 may be implemented in the form of web storage on the Internet.

The controller 1500 can control the overall operation of the electronic device 1000. For example, the controller 1500 can process various types of information or control other components of the electronic device 1000. Specifically, the controller 1500 can acquire an image through the camera 1100 and analyze the image to perform object recognition or object tracking. Alternatively, the controller 1500 can provide augmented reality by outputting augmented content through the display 1200.

The controller 1500 can be implemented as a computer or a similar device using hardware, software or a combination thereof.

In a hardware configuration, the controller 1500 can be provided as an electronic circuit that executes a control function by processing electric signals. Examples of the electronic circuit include ASICs (application specific integrated circuits), DSPs (digital signal processors), DSPDs (digital signal processing devices), PLDs (programmable logic devices), FPGAs (field programmable gate arrays), microprocessors, etc.

In a software configuration, the controller 1500 can be provided as a program for driving the hardware of the controller 1500. Accordingly, the controller 1500 can perform procedures, functions and various embodiments described in the specification. The controller 1500 in the form of software can be implemented as a software application composed of software codes of an appropriate programming language. The software application can be stored in the memory 1400.

A representative example of the electronic device 1000 according to the above-described embodiment of the present invention is a head mounted device (HMD) or smartphone.

Figure 2:
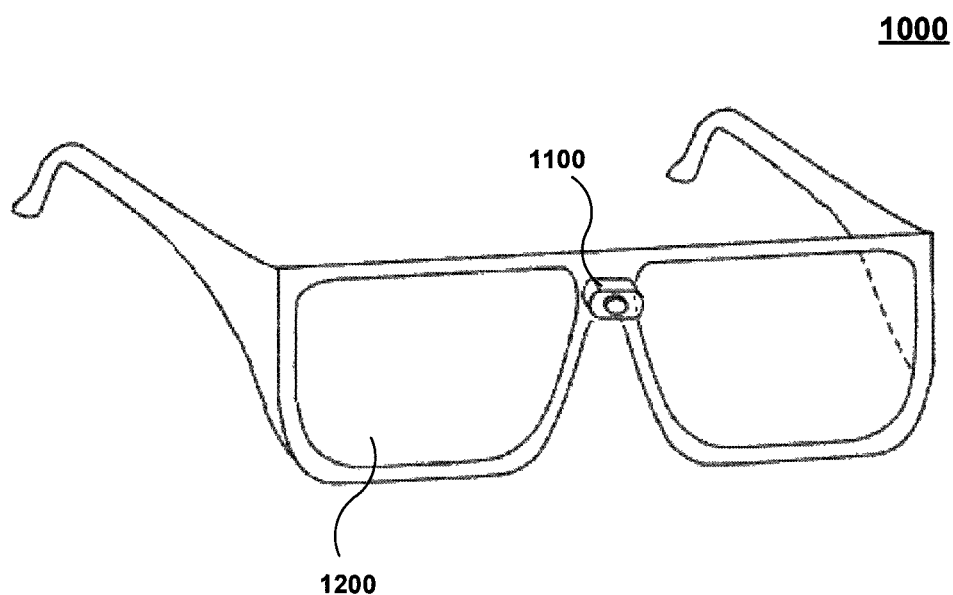
FIG. 2 is a perspective view of an example of the electronic device shown in FIG. 1.
Figure 3:
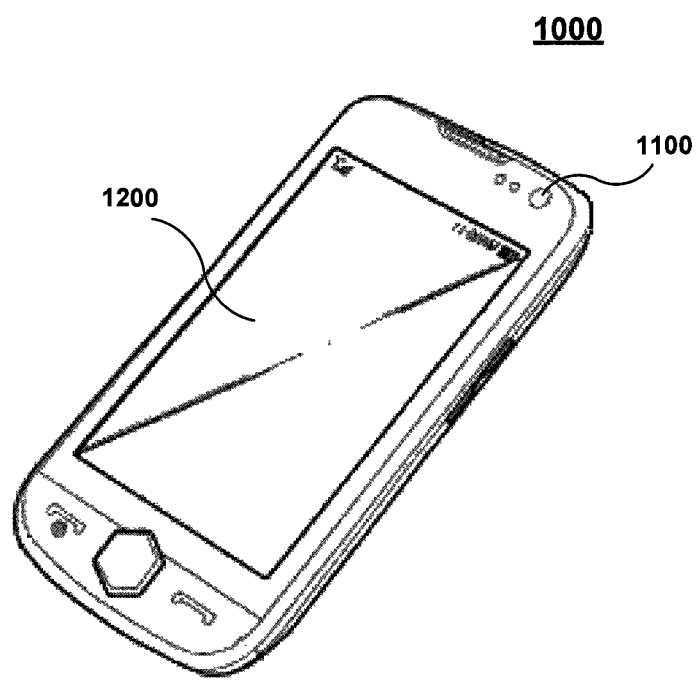
FIG. 3 is a perspective view of another example of the electronic device shown in FIG. 1.

FIG. 2 is a perspective view of an example of the electronic device 1000 of FIG. 1 and illustrates the electronic device 1000 implemented in the form of a HMD. FIG. 3 is a perspective view of another example of the electronic device 1000 of FIG. 1 and illustrates the electronic device 1000 implemented in the form of a smartphone.

The electronic device 1000 is not limited to the above-described examples and can be implemented in various forms such as a tablet PC, phablet, notebook computer, digital camera 1100, PDA (personal digital assistant), PMP (portable media player), DMB (digital multimedia broadcasting), etc.

A description will be given of a method for selecting augmented content according to another embodiment of the present invention.

The method for selecting augmented content can provide augmented reality by selectively augmenting various types of content with respect to a real object using a marker. The method for selecting augmented content can be performed by the above-described electronic device 1000.

Figure 4:
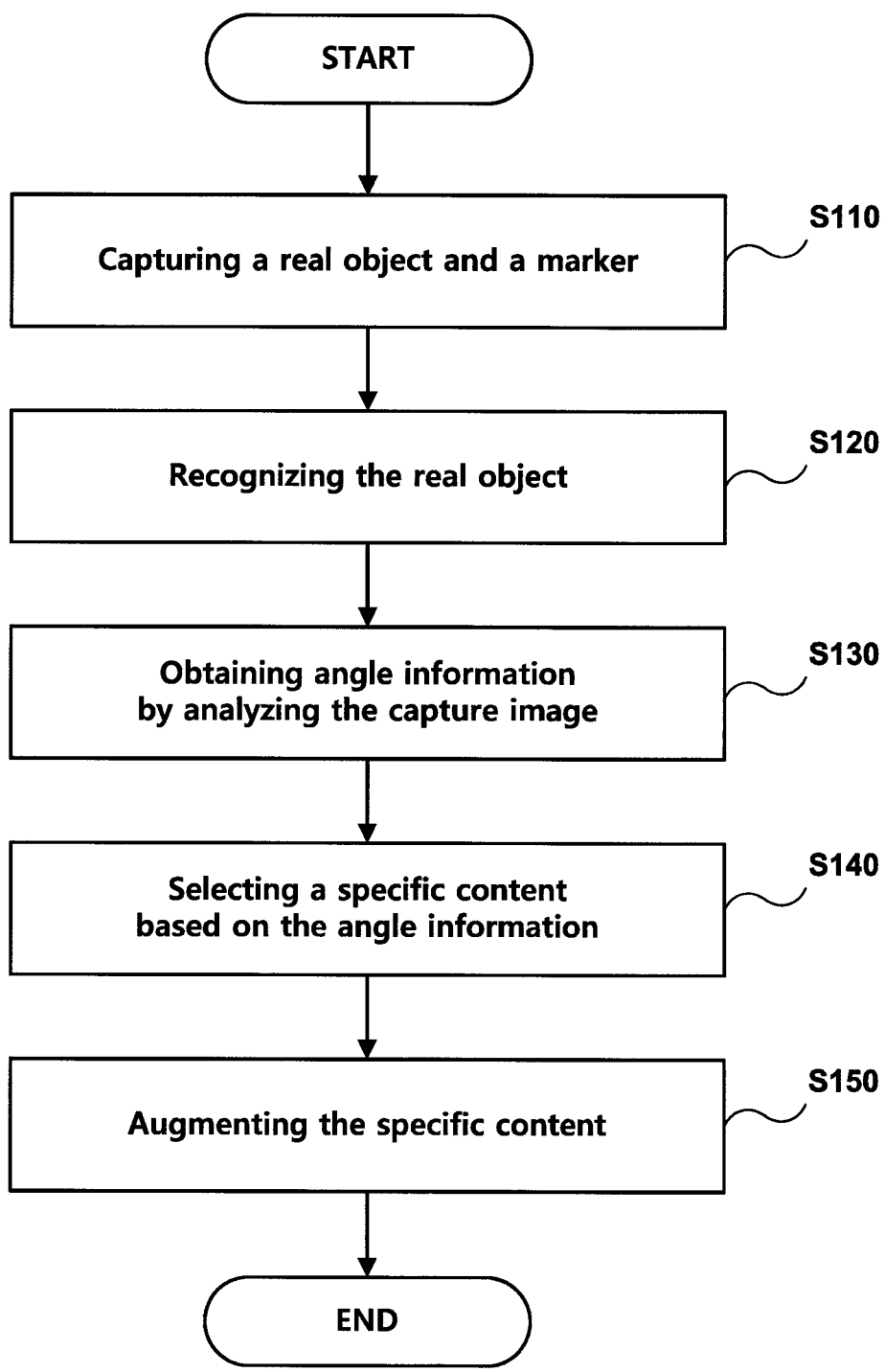
FIG. 4 is a flowchart illustrating a method for selecting augmented content according to another embodiment of the present invention.

FIG. 4 is a flowchart illustrating the method for selecting augmented content according to another embodiment of the present invention.

Referring to FIG. 4, the method for selecting augmented content can include a step S110 of capturing an image of a real object and a marker, a step S120 of recognizing the real object from the image, a step S130 of obtaining angle information by analyzing the captured image, a step 140 of selecting specific content, which will be augmented, based on the angle information and a step S150 of augmenting the specific content.

The electronic device 1000 can capture an image of the real object and the marker (S110).

The camera 1100 can capture still images or moving images of the real object and the marker. The controller 1500 can acquire an image including the real object and the marker from the still images or moving images captured by the camera 1100.

Here, the real object may be a marker-attached object or a markerless object. The marker-attached object may be implemented in the form of a bar-code including a QR (quick response) code, a color code or various codes similar thereto.

The marker is an indicator used for judging a direction on which an orientation of the real object points or a relative direction from the real object to the marker. The marker may have an easily visually recognizable form. For example, the marker can be provided in a spherical or rectangular or triangular form in a bright red color.

The electronic device 1000 can recognize the real object from the image (S120).

Here, recognition of the real object may be performed using various object recognition techniques for use in the augmented reality field.

For recognition of a marker-attached object through object recognition, for example, edges of a code attached to the real object are detected to extract a code image and the code can be decoded by analyzing the code image to recognize the real object. In the case of recognition of a markerless object, the controller 1500 detects an image region having higher than a predetermined similarity to a reference image with respect to the real object, which is stored in the memory 1400, from a captured image of the object and recognizes the detected image region as the real object.

The controller 1500 can recognize the real object from the captured image using the above described various object recognition techniques and acquire identification information on the real object.

Furthermore, the electronic device 1000 can recognize the marker from the image. Recognition of the marker can be performed by analyzing the captured image by the controller 1500 using marker based object recognition widely used in the field of augmented reality.

The electronic device 1000 can obtain the angle information by analyzing the image (S130).

Here, the angle information reflects the orientation of the marker with respect to the real object. The orientation of the marker can be divided into absolute orientation without regard to the direction in which an orientation of the real object points and relative orientation with regard to the direction in the orientation of the real object points.

The absolute orientation is defined as a direction from the real object to the marker on the image irrespective of the direction in which the real object is placed. Accordingly, if the real object and the marker are fixed, the absolute orientation of the marker is not changed even if the real object rotates in place.

The relative orientation is defined as a direction from the real object to the marker on the basis of the direction in which the real object is placed. Accordingly, even if the real object and the marker are fixed, the relative orientation of the marker is changed if the real object rotates.

An exemplary method for obtaining the angle information reflecting the absolute orientation will now be described.

Figure 5:
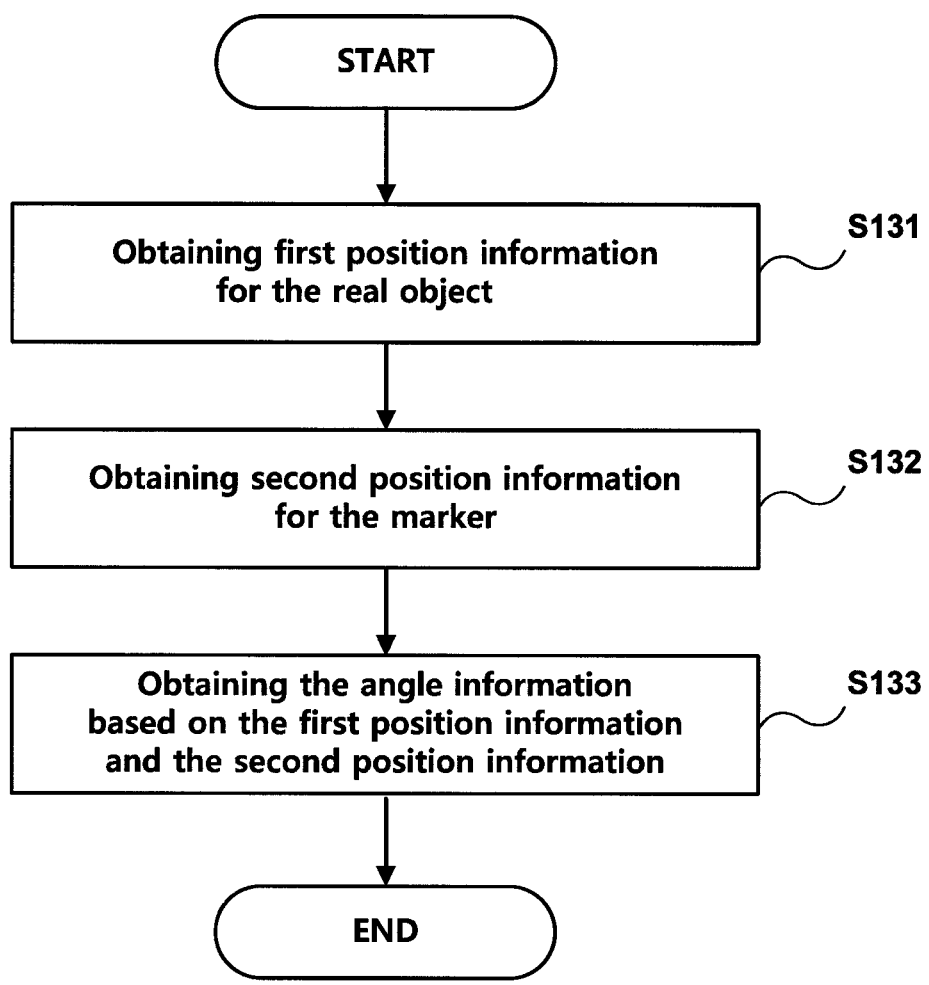
FIG. 5 is a flowchart illustrating an example of obtaining angle information in the method for selecting augmented content shown in FIG. 4.

FIG. 5 is a flowchart illustrating an exemplary method for obtaining the angle information in the method for selecting augmented content in FIG. 4.

Referring to FIG. 5, the exemplary method for obtaining the angle information can include a step S131 of acquiring first position information about the real object from the image, a step S132 of obtaining second position information about the marker from the image and a step S133 of obtaining the angle information based on the first position information and the second position information.

The electronic device 1000 can obtain the first position information about the real object and the second position information about the marker from the image (S131 and 132).

Figure 6:
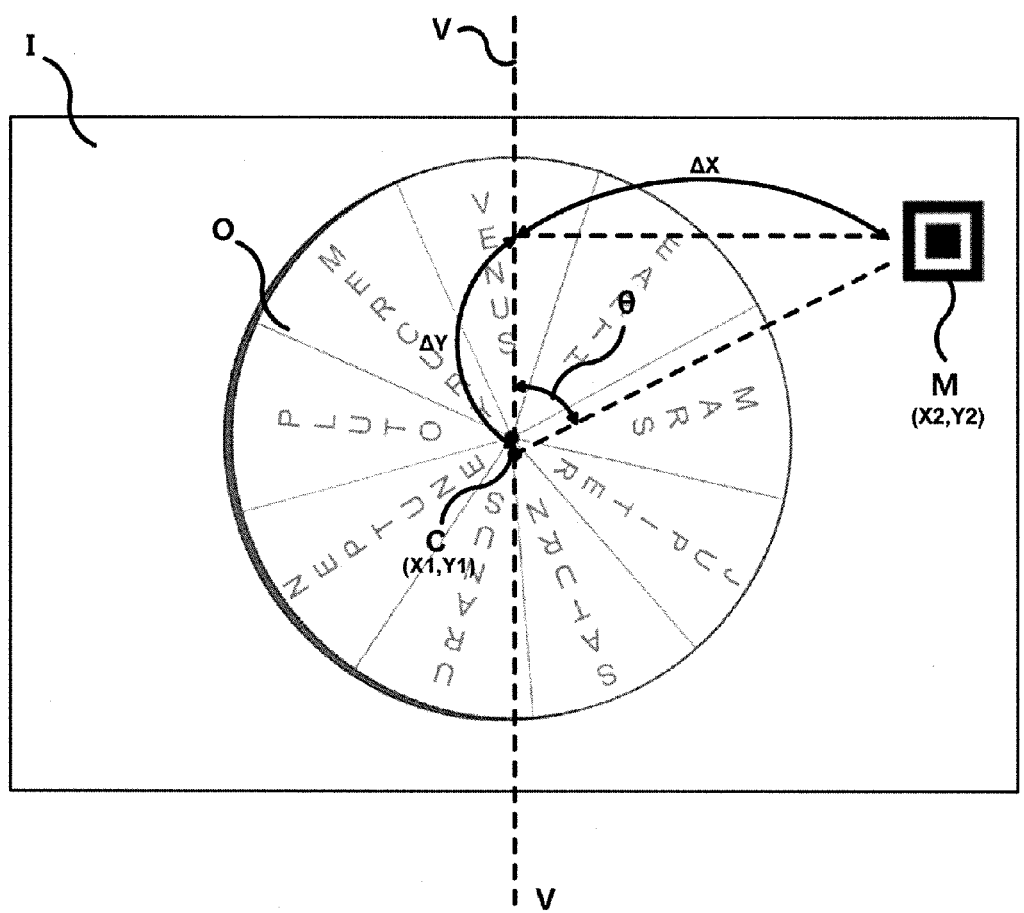
FIG. 6 illustrates an example of obtaining angle information according to the angle information acquisition process shown in FIG. 5.

FIG. 6 illustrates an example of obtaining angle information according to the method of FIG. 5.

Referring to FIG. 6, a captured image I includes a real object O and a marker M. Upon recognition of the real object O and the marker M from the captured image I, coordinates (x1, y1) of the center C of the real object O and coordinates (x2, y2) of the marker M in the image I can be obtained.

The controller 1500 can acquire the coordinates of the center C of the real object O as the first position information and obtain the coordinates of the marker M as the second position information.

Upon acquisition of the first position information and the second position information, the electronic device 1000 can obtain the angle information using the first position information and the second position information (S133).

Referring back to FIG. 6, the gradient of a half line D starting from the center C of the real object to the marker M corresponds to $\Delta x = x2-x1$ and $\Delta y = y2-y1$. The direction from the real object O to the marker M based on a predetermined direction in the image I, for example, the vertical direction V corresponds to angle $\theta$ which is $\tan^{-1}(\Delta y/\Delta x)$.

The controller 1500 can obtain the gradient or the angle as the angle information.

A description will be given of an exemplary method for obtaining angle information reflecting relative orientation.

Figure 7:
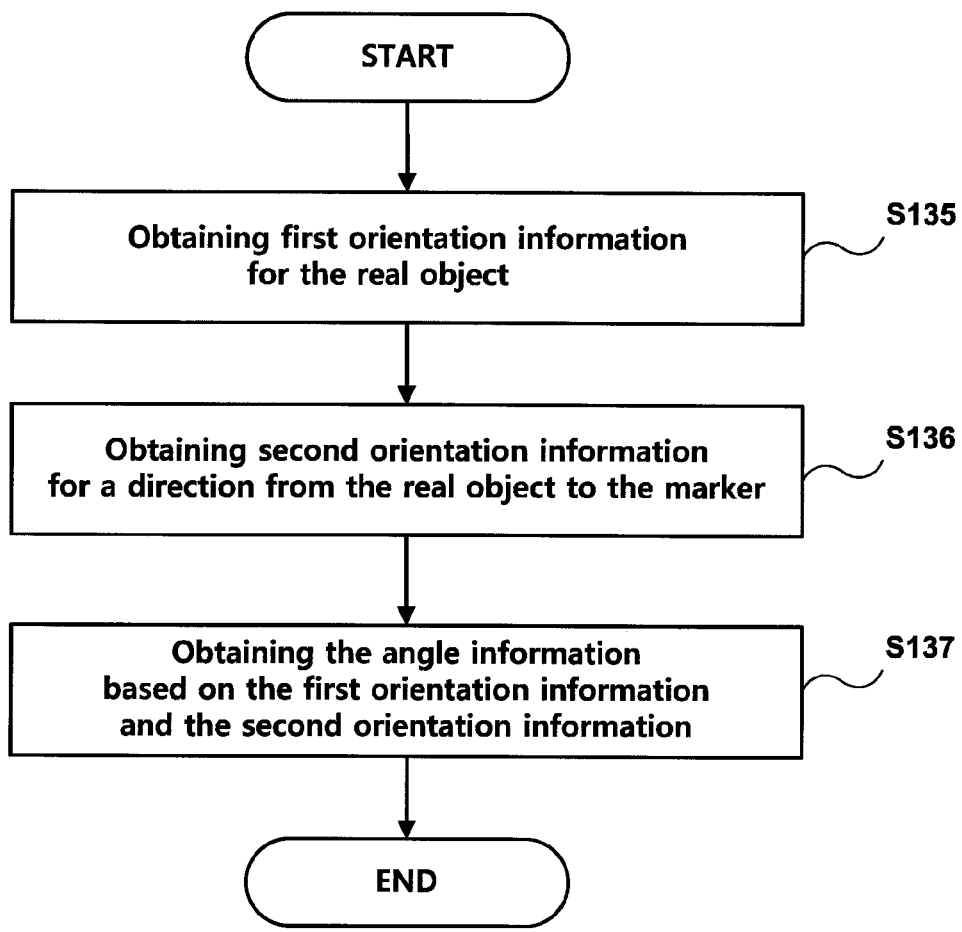
FIG. 7 is a flowchart illustrating another example of obtaining angle information in the method for selecting augmented content shown in FIG. 4.

FIG. 7 is a flowchart illustrating another exemplary method for obtaining the angle information in the augmented content selection method shown in FIG. 4.

Referring to FIG. 7, the exemplary method for obtaining the angle information can include a step S135 of acquiring first orientation information about the real object from the image, a step S136 of obtaining second orientation information about a direction from the real object to the marker from the image and a step S137 of obtaining the angle information based on the first orientation information and the second orientation information.

The electronic device 1000 can obtain the first orientation information about the real object from the image (S135).

Figure 8:
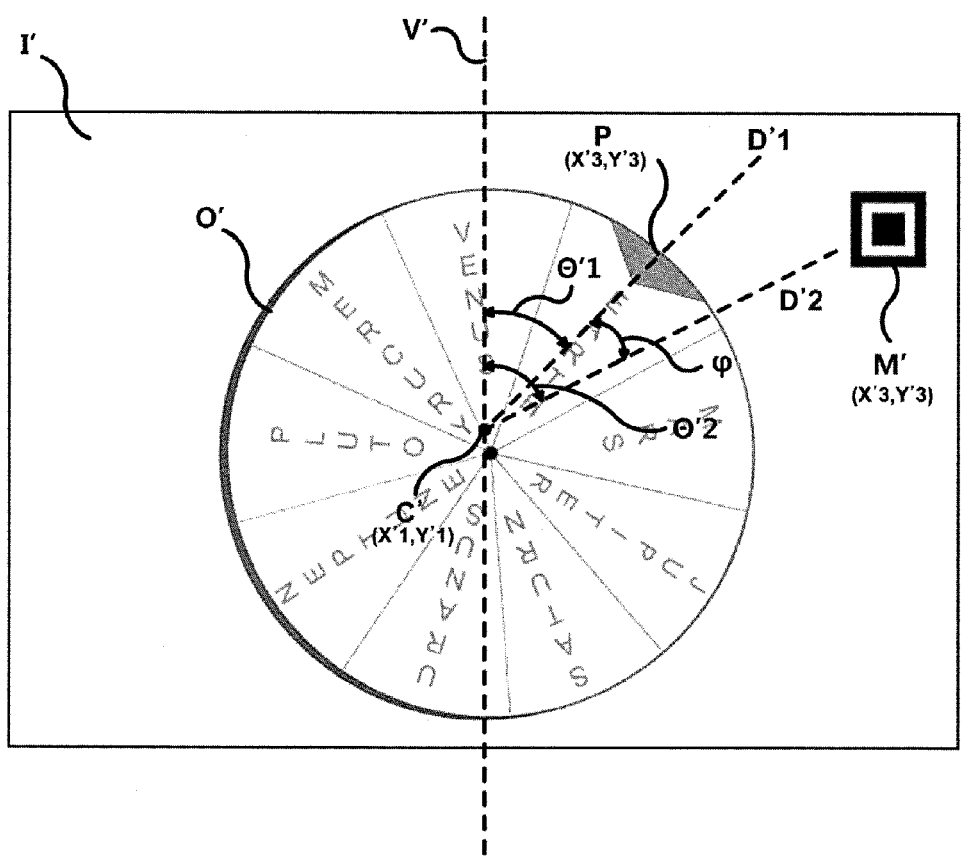
FIG. 8 illustrates an example of obtaining angle information according to the method shown in FIG. 7.

FIG. 8 illustrates an example of obtaining angle information according to the method of FIG. 7.

Referring to FIG. 8, an image I' is a 2D still image with resolution of (x', y'), captured by the camera 1100, and includes a real object O' and a marker M'. Here, the direction in which the real object O' is placed can be defined as a direction from the center C' of the real object O' to a predetermined point P' of the real object O'.

The gradient of a half line D1' from the center C' to the predetermined point P' can be calculated as $\Delta x'=x'2-x'1$ and $\Delta y'=y'2-y'1$ using coordinates (x1', y1') of the center C' and coordinates (x2', y2') of the predetermined point P'. The direction from the center C' to the predetermined point P' based on a predetermined direction on the image I', for example, the vertical direction V' corresponds to angle θ' which is $\tan^{-1}(\Delta y'/\Delta x')$.

The controller 1500 can obtain the gradient or the angle as the second orientation information.

The electronic device 1000 can obtain the second orientation information about the direction from the real object to the marker from the image (S136).

Referring back to FIG. 8, the coordinates of the center C' of the real object O' are (x'1, y'1) and the coordinates of the marker M' are (x'3, y'3). The gradient of a half line D2' from the center C' of the real object O' to the marker M' corresponds to $\Delta x''=x'3-x'1$ and $\Delta y''=y'3-y'1$. The direction from the center C' to the marker M' based on a predetermined direction on the image I', for example, the vertical direction V' corresponds to angle θ" which is $\tan^{-1}(\Delta y''/\Delta x'')$.

The controller 1500 can obtain the gradient or the angle as the first orientation information.

The electronic device 1000 can obtain the angle information using the first orientation information and the second orientation information.

Referring back to FIG. 8, the gradient between the direction in which the real object O' is placed and the direction from the real object O' to the marker M', that is, the gradient of the half line D'2 with respect to the half line D'1 can be calculated as $(\Delta y''/\Delta x'')-(\Delta y'/\Delta x')$.

The gradient corresponds to the angle φ between the direction in which the real object O' is placed and the direction from the real object O' to the marker M'. The angle φ can be calculated as (θ"−θ'). Otherwise, the angle φ can be calculated based on the gradient of the half line D'2 with respect to the half line D'1. Here, the angle φ can be calculated as $\tan^{-1}[(\Delta y''/\Delta x'')-(\Delta y'/\Delta x')]$.

The controller 1500 can obtain the gradient of the half line D'2 with respect to the half line D'1 or the angle φ as the angle information.

Upon acquisition of the angle information as described above, the electronic device 1000 can select content to be augmented on the basis of the angle information.

According to one embodiment, the memory 1400 stores a plurality of pieces of content each of which is connected with an angle value. The controller 1500 can select specific content to be augmented from the plurality of pieces of content based on the angle value of the obtained angle information.

FIG. 9 illustrates an exemplary data table of the memory 1400 used for the method of selecting augmented content shown in FIG. 4.

As shown in FIG. 9, the memory 1400 stores the first content to the ninth content. Here, the content may be a virtual object to be augmented. These nine pieces of content may respectively correspond to images of Mercury, Venus, Earth, Mars, Jupiter, Saturn, Uranus, Neptune and Pluto. The first content is connected with an angle value in the range of 0° to 40°, the second content is connected with an angle value in the range of 40° to 80° and the ninth content is connected with an angle value in the range of 320° to 360°.

When the controller 1500 obtains angle information corresponding to 75° in step S130, the controller 15000 can select, from the data table, the image of Venus corresponding to the angle value of 75° as the specific content to be augmented. Similarly, when the angle information corresponds to 297°, the image of Neptune can be selected as the specific content.

According to another embodiment, the memory 1400 stores a plurality of pieces of content each of which is connected with a real object identification information and an angle value. The controller can select specific content to be augmented from the plurality of pieces of contents based on the angle value of the angle information and the real object identification information.

FIG. 10 illustrates another exemplary data table of the memory 1400 used for the method of selecting augmented content shown in FIG. 4.

As shown in FIG. 10, the memory 1400 stores the first content to the fifteenth content.

Here, the first content to the ninth content are associated with a first real object. The first content to the ninth content may be assigned the same content group identifier. Specifically, the first content to the ninth content may respectively correspond to images of Mercury, Venus, Earth, Mars, Jupiter, Saturn, Uranus, Neptune and Pluto, which are respectively connected with an angle value in the range of 0° to 40°, an angle value in the range of 40° to 80°, ..., and an angle value in the range of 320° to 360°.

The tenth content to the fifteenth content are associated with a second real object. The tenth content to the fifteenth content may be assigned the same content group identifier. Specifically, the tenth content to the fifteenth content may respectively correspond to images of the Asia, Europe, North America, South America, Africa and Oceania, which are respectively connected with an angle value in the range of 0° to 60°, an angle value in the range of 60° to 120°, ..., and an angle value in the range of 300° to 360°.

When identification information, obtained by the controller 1500 by recognizing the first real object from an image, indicates the first real object and the angle information corresponds to 113°, the controller 1500 can select the image of Earth as the specific content to be augmented. When the second real object is selected and the angle information corresponds to 113°, the controller 1500 can select the image of Europe as the specific content to be augmented.

Here, the controller 1500 can select specific content using the real object identification information and the angle information together or can select a content group first using the real object identification information and then select specific content corresponding to the angle information from the content group.

Upon selection of the specific content, the electronic device 1000 can augment the specific content (S150).

According to one embodiment, the controller 1500 can generate an augmented image by inserting the specific content into the image captured by the camera 1100. Here, the specific content may be inserted into the position of the real object. The controller 1500 can display the augmented image through the display 1200.

According to another embodiment, the controller 1500 may display only the specific content. Particularly, when the display 1200 is implemented as a transparent display, the controller 1500 can determine a position on the transparent display on which the real object is projected and display the specific content at the position on which the real object is projected.

According to the above-described method, the electronic device 1000 can select the specific content to be augmented on the basis of the angle information. Accordingly, when a user adjusts the orientation of the marker with respect to the real object by moving the marker around the real object or rotating the real object, the electronic device 1000 can sense adjustment of the orientation of the marker and change augmented content.

Also, the relative orientation of the marker with respect to the real object is defined as a rotated angle of the real object with respect to a reference direction from the real object to the marker. In this case the electronic device 1000 obtains, using the image, orientation information about the orientation of the real object and direction information about the reference direction and calculates the angle information based on the orientation information and the direction information.

Figure 11:
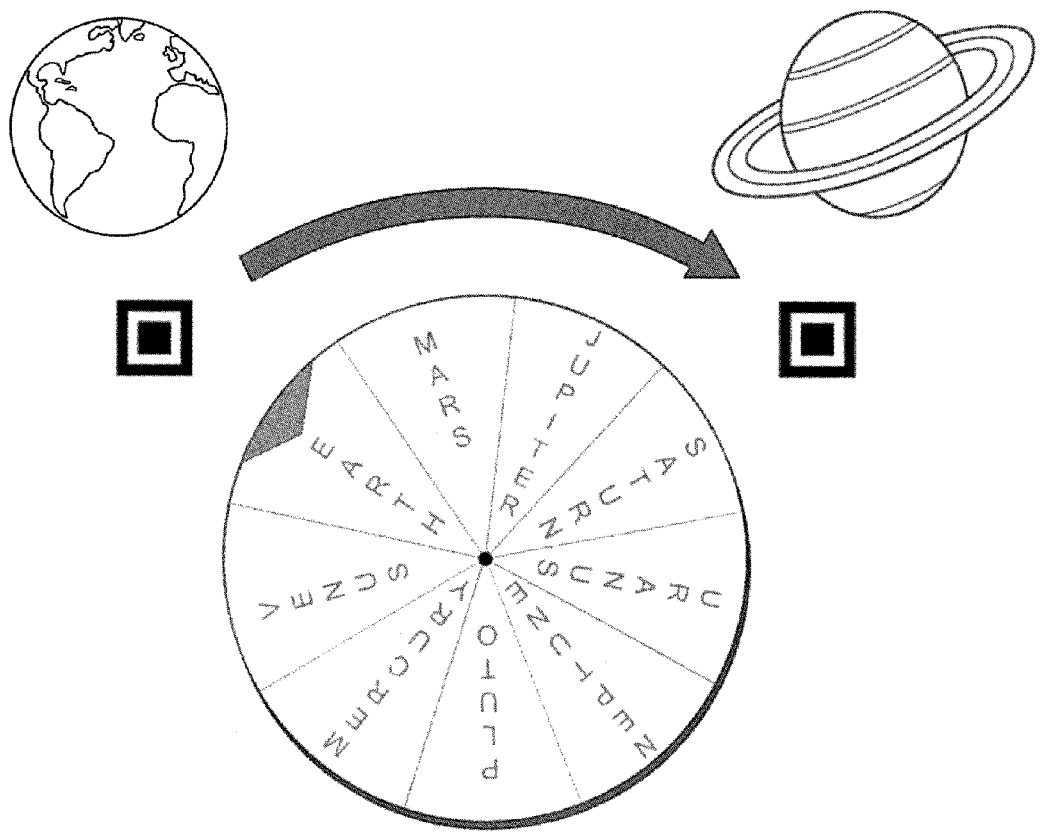
FIG. 11 illustrates an embodiment of the method for selecting augmented content shown in FIG. 4.

FIG. 11 illustrates an embodiment of the method for selecting augmented content shown in FIG. 4;

Referring to FIG. 11, the real object may be provided in the form of a disc. When the marker is placed at a position corresponding to "Earth" of the real object, the electronic device 1000 can augment the image of "Earth". Here, when the user moves the marker to a position corresponding to "Saturn", the electronic device 1000 can sense the marker movement and augment the image of "Saturn" instead of the image of "Earth".

Here, the real object may be provided in the form of a hexagon. The electronic device determines that the real object correspond not to the planets but to the continents based on the identification information based on the hexagonal form of the real object. The marker may be fixed to a predetermined position. When "Asian continent" of the real object is located toward the marker, the electronic device 1000 can sense the location and augment the image of "Asian continent". If the user rotates the real object such that the marker indicates "African continent", the electronic device 1000 can augment the image of "African continent".

Figure 12:
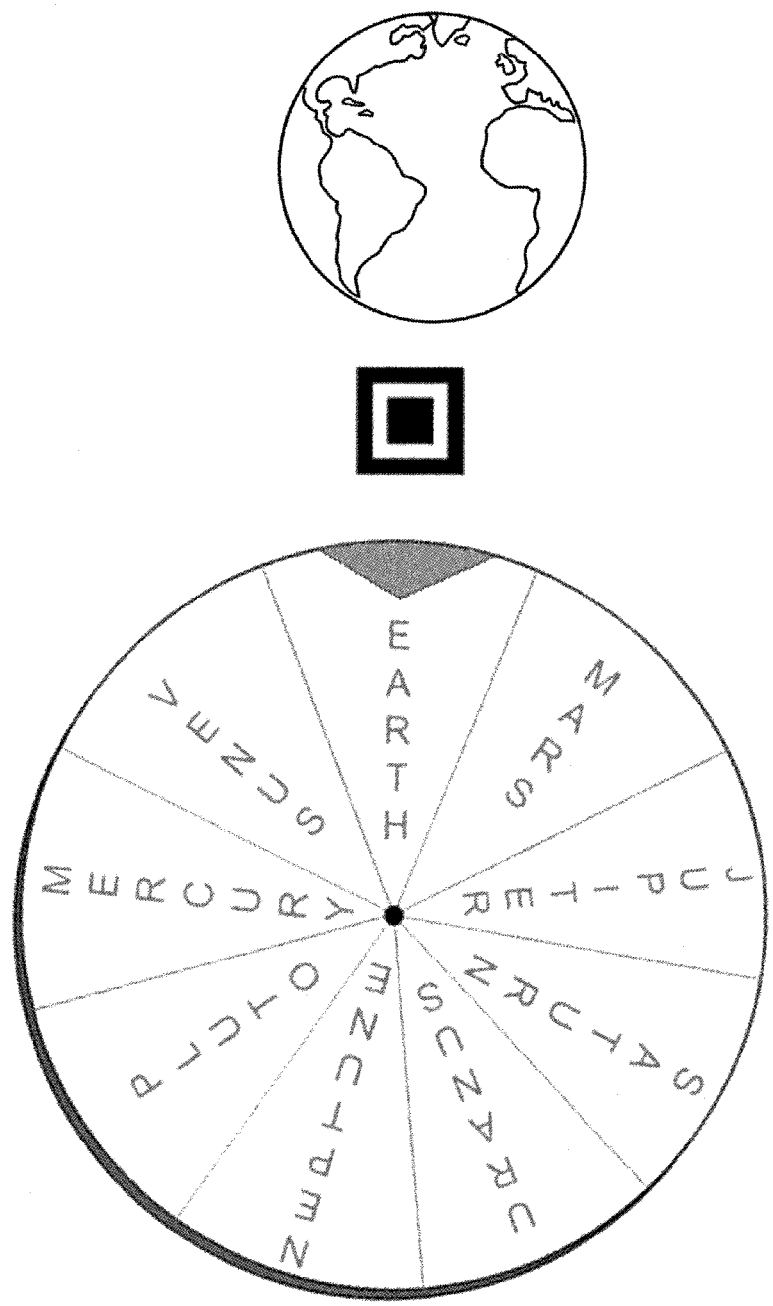
FIGS. 12 and 13 illustrate another embodiment of the method for selecting augmented content shown in FIG. 4.
Figure 13:
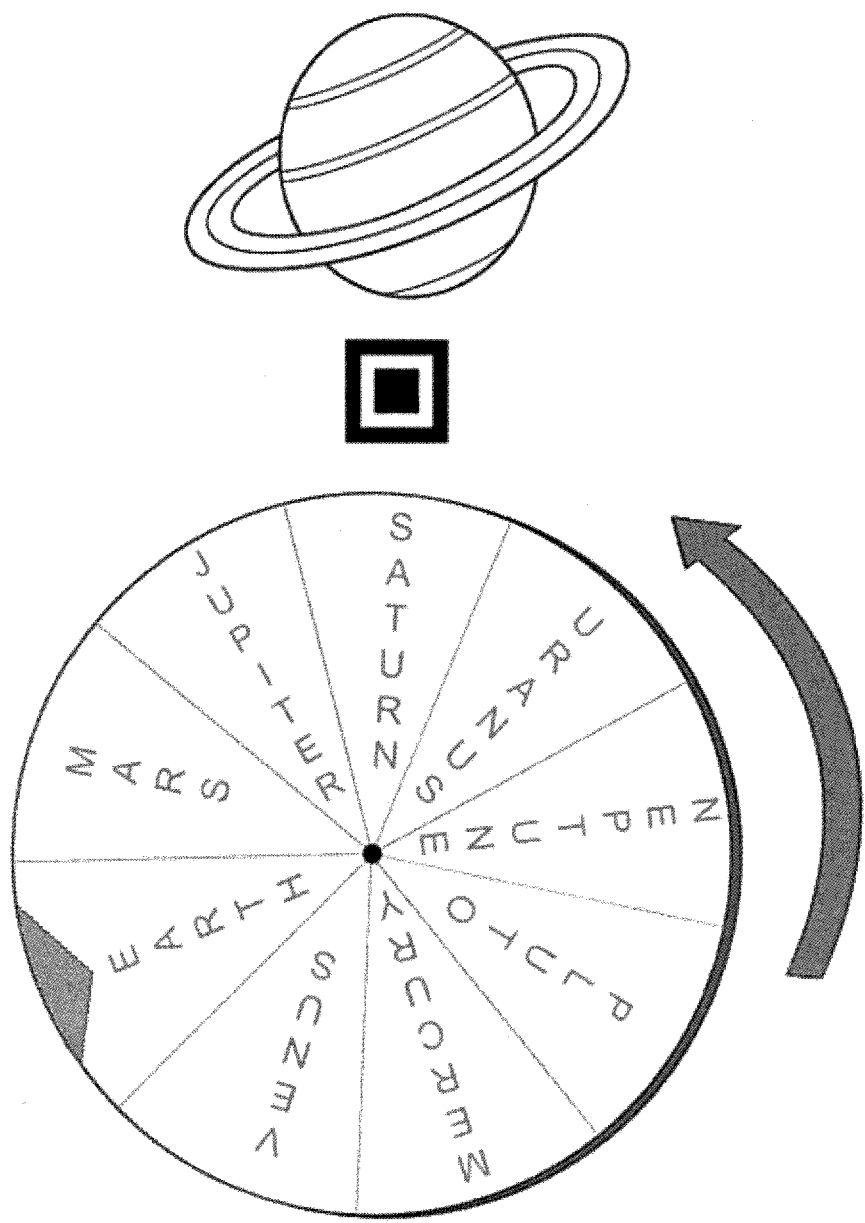

FIGS. 12 and 13 illustrate another embodiment of the method for selecting augmented content shown in FIG. 4;

Referring to FIGS. 12 and 13, the real object may be provided in the form of a disc. When the region corresponding to "Earth" of the disc is align with the marker, the electronic device 1000 can augment the image of "Earth". Here, when the user rotates the disc for aligning the region corresponding to "Saturn" of the disc with the marker, the electronic device 1000 can sense the rotation of the disc and augment the image of "Saturn" instead of the image of "Earth".

Here, the real object may be provided in the form of a hexagon. The electronic device determines that the real object correspond not to the planets but to the continents based on the identification information based on the hexagonal form of the real object.

When the region corresponding to "Asian continent" of the hexagon is align with the marker, the electronic device 1000 can augment the image of "Asian continent". Here, when the user rotates the hexagon for aligning the region corresponding to "African continent" of the hexagon with the marker, the electronic device 1000 can sense the rotation of the hexagon and augment the image of "African continent".

A description will be given of a method for selecting augmented content according to another embodiment of the present invention.

Figure 14:
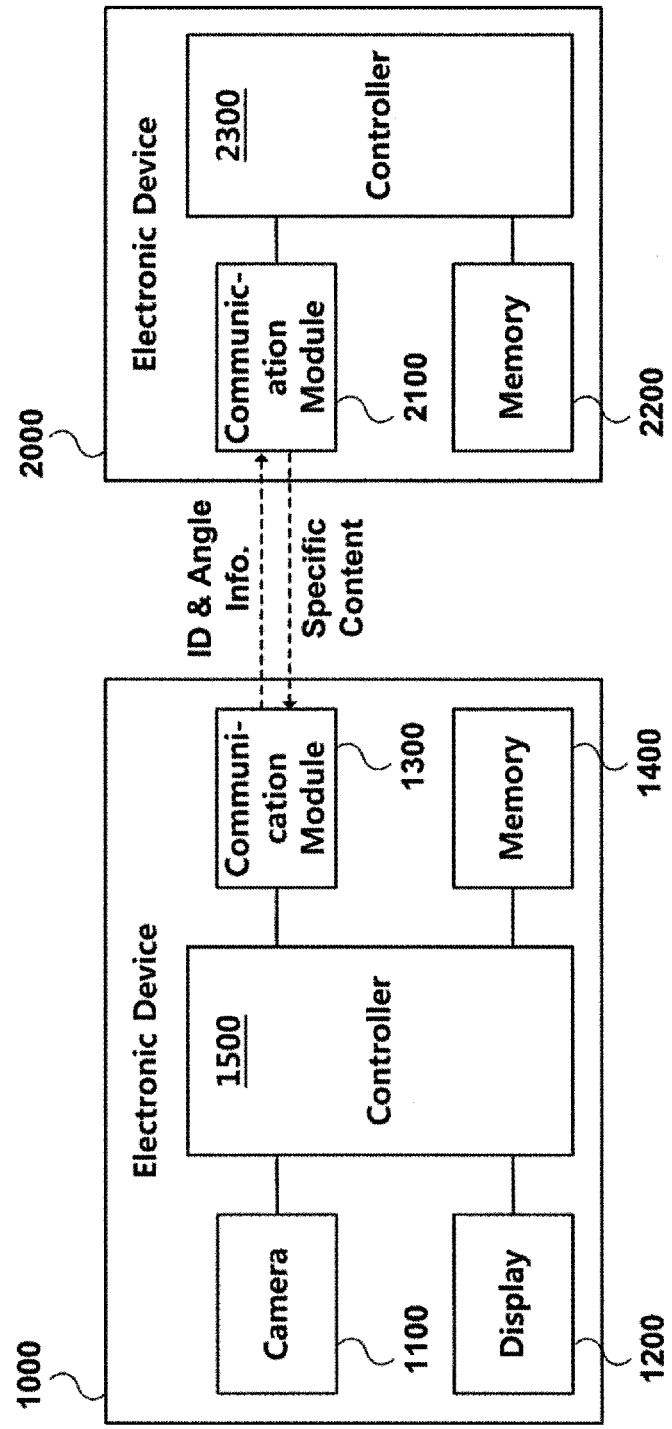
FIG. 14 is a block diagram of a system for performing a method for selecting augmented content according to another embodiment of the present invention.

The method for selecting augmented content according to another embodiment of the present invention can be performed by a system including the electronic device 1000 and a server 2000. FIG. 14 is a block diagram of a system for performing a method for selecting augmented content according to another embodiment of the present invention; When a large amount of augmented content is present or augmented content corresponds to a high definition image or a moving image, it may be difficult to store all augmented content in the memory 1400 of the electronic device 1000 due to limited storage capacity of the electronic device 1000. Accordingly, the electronic device 1000 may advantageously augment only desired content by receiving the content from the server 2000 using the cloud service. The sever 2000 comprises a communication module 2100, a memory 2200 and a controller 2300. The communication module 2100, the memory 2200 and the controller 2300 may perform the same or similar function or operation with the communication module 1300, the memory 1400 and the controller 1500 of the electronic device 1000. The communication module 2100 communicates with the electronic device 2000. For example, the communication module 2100 may receive the identification information and angle information from the electronic device 1000 and transmit the specific content determined based on the identification information and the angle information. The memory 2200 may stores the content group. And the controller 2300 may control the overall operation of the server 2000. For example, the controller 2300 can process various types of information or control other components of the server 2000.

Figure 15:
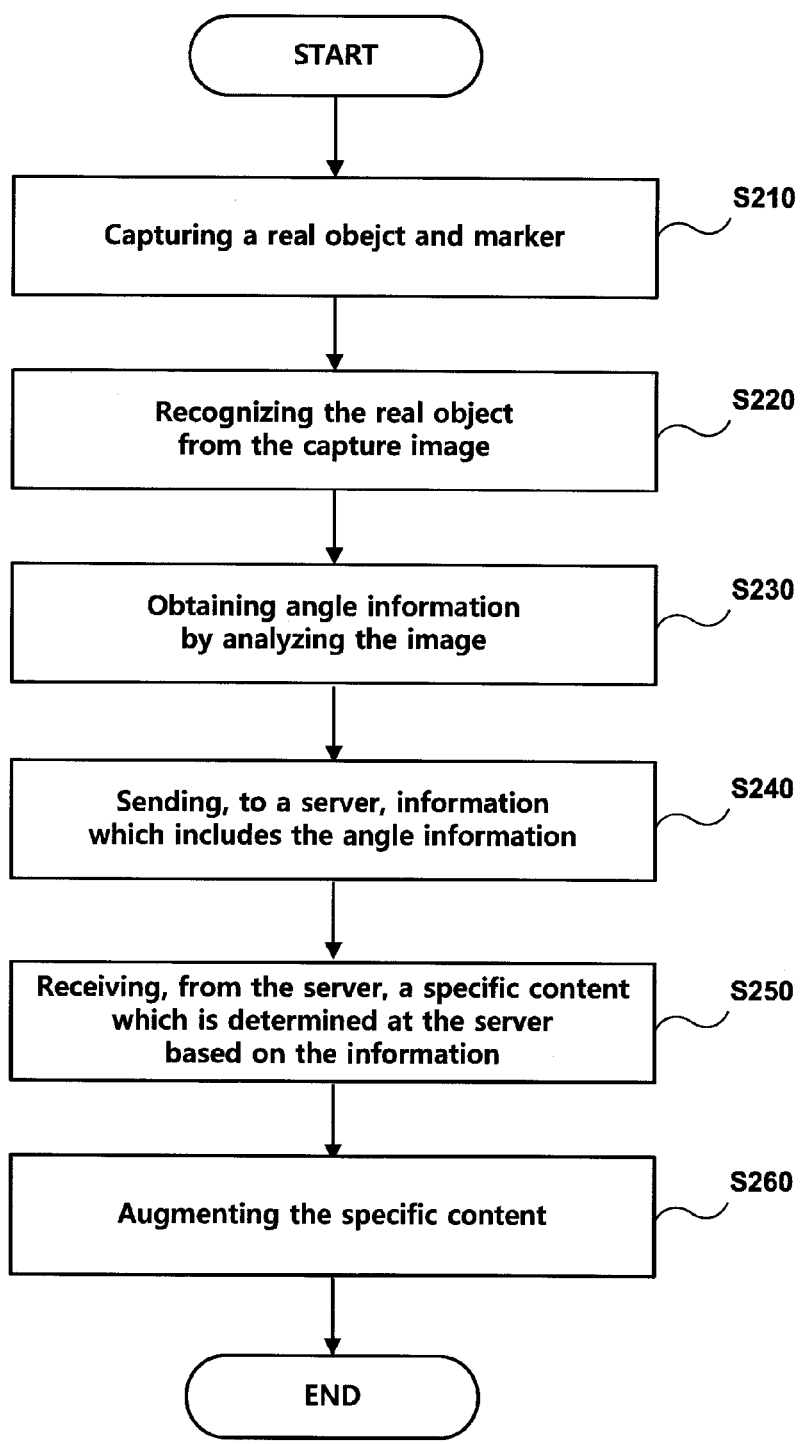
FIG. 15 is a flowchart illustrating a method for selecting augmented content according to another embodiment of the present invention.

FIG. 15 is a flowchart illustrating a method for selecting augmented content according to another embodiment of the present invention.

Referring to FIG. 15, the method for selecting augmented content may include a step S210 in which the electronic device 1000 captures an image of the real object and the marker, a step S220 in which the electronic device 1000 recognizes the real object from the image, a step S230 in which the electronic device 1000 obtains angle information by analyzing the image, a step S240 in which the electronic device 1000 sends information including the angle information to the server 2000, a step S250 in which the server 2000 sends content to be augmented to the electronic device 1000 on the basis of the information and a step S260 in which the electronic device 1000 augments the received content.

Here, steps 210, S220 and S230 can be performed in a manner identical or similar to steps S110, S120 and S130.

The electronic device 1000 can transmit the predetermined information to the server 2000 (S240).

In one embodiment, the controller 1500 may select content to be augmented in a manner identical or similar to step S140 and send identification information on the selected content to the server 2000 through the communication module 1300.

In another embodiment, the controller 1500 can send the angle information to the server 2000 through the communication module 1300. Here, the controller 1500 may transmit real object identification information or content group identification information along with the angle information.

The server 2000 can send the content to be augmented to the electronic device 1000 on the basis of the received information (S250).

In one embodiment, upon reception of the identification information on the specific content from the electronic device 1000, the server 2000 can transmit the content indicated by the content identification information to the electronic device 1000.

According to another embodiment, the server 2000 can receive the angle information from the electronic device 1000, select specific content from a plurality of pieces of content stored therein and transmit the selected specific content to the electronic device 1000. Here, a data table for content selection is stored in the server 2000 and the server 2000 can select content in a manner identical or similar to step S140. The server 2000 may further receive the real object identification information or content group identification information and use the same to select specific content.

Upon reception of the specific content, the electronic device 1000 can augment the specific content (S260) to provide augmented reality.

The above-described steps are not essential in the augmented content selection method and thus some of the steps may be omitted. In addition, since the above-described steps need not be performed in the described order, a later step may precede a preceding step.

Although exemplary aspects of the present invention have been described for illustrative purposes, those skilled in the art will appreciate that various modifications, additions and substitutions are possible, without departing from essential characteristics of the invention. Thus, embodiments disclosed herein are exemplary only and not to be considered as a limitation of the invention. Accordingly, the scope of the invention is not to be limited by the above aspects but by the claims and the equivalents thereof.

According to the present invention, it is possible to easily change augmented content by rotating a real object or moving a marker around the real object.

The effects of the present invention are not limited to the above-described effects and other effects which are not described herein will become apparent to those skilled in the art from the following description.

What is claimed is:

1. An electronic device providing augmented reality, comprising:
 a memory storing at least one content group, wherein each of the at least one content group includes a plurality of virtual objects;
 a camera;
 a display; and
 a controller configured to:
 capture, via the camera, an image including a real object and a marker,
 obtain identification information on the real object based on the image,
 obtain angle information reflecting an orientation of the marker with respect to the real object using the image, wherein the angle information is calculated based on a gradient of a line starting from a point of the real object to the marker,
 determine a specific content group from the at least one content group based on the identification information,
 select, according to the angle information, a specific virtual object among the virtual objects in the specific content group, wherein at least two different virtual objects in the specific content group correspond to different angle information, and
 augment, via the display, the specific virtual object.

2. The electronic device according to claim 1, wherein the orientation of the marker with respect to the real object is defined as a direction from the center of the real object to the marker.

3. The electronic device according to claim 2, wherein the controller obtains, using the image, first position information about the real object and second position information about the maker and calculates the angle information based on the first position information and the second position information, wherein the first position information indicates coordinates of a center of the real object and the second position information indicates coordinates of the marker.

4. The electronic device according to claim 1, wherein the orientation of the marker with respect to the real object is defined as a rotated angle of the real object with respect to a reference direction from the real object to the marker.

5. The electronic device according to claim 4, wherein the controller obtains, using the image, orientation information about the orientation of the real object and direction information about the reference direction and calculates the angle information based on the orientation information and the direction information.

6. The electronic device according to claim 1, wherein the display includes a transparent display and the controller displays, via the transparent display, the specific virtual object at a region where the real object is projected.

7. The electronic device according to claim 1, wherein the controller generates an augmented image by inserting the specific virtual object into the captured image, and displays, via the display, the augmented image.

8. The electronic device according to claim 1, wherein the controller augments the specific virtual object to the real object.

9. An electronic device providing augmented reality, comprising:
 a communication module communicating with an external device;
 a camera;
 a display; and
 a controller configured:
 capture, via the camera, an image including a real object and a marker,
 obtain identification information on the real object based on the image,
 obtain angle information reflecting an orientation of the marker with respect to the real object using the image, wherein the angle information is calculated based on a gradient of a line starting from a point of the real object to the marker,
 send, via the communication module, the identification information and the angle information to a server, wherein the server comprises a database storing at least one content group and each of the at least one content group includes a plurality of virtual objects,
 receive, via the communication module, a specific virtual object from the server, wherein the server determines a specific content group from the at least one content group based on the identification information and selects, according to the angle information, a specific virtual object among the virtual objects, wherein at least two different virtual objects in the specific content group correspond to different angle information, and augment, via the display, the specific virtual object.

10. The electronic device according to claim 9, wherein the controller obtains, using the image, first position information about the real object and second position information about the marker and calculates the angle information based on the first position information and the second position information, wherein the first position information indicates coordinates of a center of the real object and the second position information indicates coordinates of the marker.

11. The electronic device according to claim 9, wherein the orientation of the marker with respect to the real object is defined as a rotated angle of the real object with respect to a reference direction from the real object to the marker.

12. The electronic device according to claim 11, wherein the controller obtains, using the image, orientation information about the orientation of the real object and direction information about the reference direction from the real object to the marker and calculates the angle information based on the orientation information and the direction information.

13. The electronic device according to claim 9, wherein the display includes a transparent display and the controller displays, via the transparent display, the specific virtual object, at a region where the real object is projected.

14. The electronic device according to claim 9, wherein the controller generates an augmented image by inserting the specific virtual object into the captured image, and displays, via the display, the augmented image.

15. The electronic device according to claim 9, wherein the controller augments the specific virtual object to the real object.

16. A method for selecting augmented content, performed by an electronic device providing augmented reality, the method comprising:
    capturing an image including a real object and a marker;
    obtaining identification information on the real object based the image;
    obtaining angle information reflecting an orientation of the marker with respect to the real object using the image, wherein the angle information is calculated based on a gradient of a line starting from a point of the real object to the marker; and
    augmenting a specific virtual object corresponding to the orientation of the marker with respect to the real object among a plurality of virtual objects corresponding to the real object, wherein at least two different virtual objects in the specific content group correspond to different angle information.

17. The method according to claim 16, wherein the obtaining the angle information comprises:
    obtaining first position information about the real object and second position information about the marker using the image; and
    calculating the angle information based on the first position information and the second position information, wherein the first position information indicates coordinates of a center of the real object and the second position information indicates coordinates of the marker.

18. The method according to claim 16, wherein the obtaining the angle information comprises:
    obtaining orientation information about an orientation of the real object and direction information about a direction from the real object to the marker using the image; and
    calculating the angle information based on the orientation information and the direction information.

19. The method according to claim 16, wherein the augmenting comprises:
    determining the plurality of the virtual objects from pre-stored virtual objects based on the identification information;
    selecting the specific virtual object among the plurality of the virtual object based on the angle information; and
    augmenting the selected specific virtual object to the real object.

20. The method according to claim 16, wherein the augmenting comprises:
    sending the identification information and the angle information to a server, wherein the server comprises a database storing pre-stored virtual objects;
    receiving the specific virtual object from the server, wherein the server determines the plurality of the virtual objects from the pre-stored virtual objects based on the identification information; and
    augmenting the received specific virtual object to the real object.

21. The method according to claim 16, wherein the augmenting comprises displaying the specific virtual object on a transparent display at a region where the real object is projected.

22. The method according to claim 16, wherein the augmenting comprises:
    generating an augmented image by inserting the specific virtual object into the captured image; and
    displaying the augmented image.

23. The method according to claim 16, wherein the augmenting comprises augmenting the specific virtual object to the real object.

* * * * *